United States Patent [19]
Uziie et al.

[11] Patent Number: 5,483,383
[45] Date of Patent: Jan. 9, 1996

[54] LENS HOLDER

[75] Inventors: Seiji Uziie; Kazuyoshi Azegami; Hiroshi Nomura, all of Tokyo, Japan

[73] Assignee: Asahi Kogaku Kogyo Kabushiki Kaisha, Tokyo, Japan

[21] Appl. No.: 165,998

[22] Filed: Dec. 14, 1993

[30] Foreign Application Priority Data

Dec. 15, 1992 [JP] Japan ................ 4-85962 U

[51] Int. Cl.$^6$ ................................ G02B 7/02
[52] U.S. Cl. ................................ 359/819; 425/577
[58] Field of Search ................ 359/811, 818, 359/819, 820, 822, 823, 830; 425/577, 808, 468, DIG. 10

[56] References Cited

U.S. PATENT DOCUMENTS

| | | |
|---|---|---|
| 3,784,287 | 1/1974 | Grey ................ 359/819 |
| 3,904,276 | 9/1975 | Whitaker ................ 359/819 |
| 4,026,983 | 5/1977 | Stockwell ................ 264/89 |
| 4,303,306 | 12/1981 | Ookawa ................ 359/819 |
| 4,668,047 | 5/1987 | Okura . |
| 4,886,342 | 12/1989 | Kudo ................ 359/819 |
| 5,117,311 | 5/1992 | Nomura . |
| 5,157,430 | 10/1992 | Ogawa . |
| 5,177,641 | 1/1993 | Kobayashi et al. . |
| 5,257,145 | 10/1993 | Kanazawa et al. . |
| 5,264,966 | 11/1993 | Okada ................ 359/823 |

*Primary Examiner*—Georgia Y. Epps
*Assistant Examiner*—Ricky Mack
*Attorney, Agent, or Firm*—Sandler, Greenblum & Bernstein

[57] ABSTRACT

A lens holder having a cylindrical lens frame which holds at least one pair of lenses, wherein said lens frame is provided with a lens abutting surface which comes into contact with a first lens to restrict an axial position thereof. The first lens is provided with a positioning reference surface against which the second lens abuts to determine the axial position thereof. A molding die assembly which is used to mold the lens frame is also disclosed.

12 Claims, 2 Drawing Sheets

LENS HOLDER

BACKGROUND OF THE INVENTION

1. Field of the Invention

The present invention relates to a lens holder. More precisely, it relates to a lens holder having a cylindrical lens frame which holds at least one pair of lenses. The present invention also relates to a molding die assembly for molding the lens frame.

2. Description of Related Art

In a conventional lens holder having a cylindrical lens frame which holds a pair of lenses, the lens frame is provided on an inner peripheral surface thereof with an inner radial flange which separates the lenses at a predetermined distance. The lenses come into contact with front and rear surfaces of the radial flange so as to adjust the position of the lenses in the optical axis direction.

However, in the known lens supporting mechanism, the interior of the lens frame is divided into two circular regions by the inner radial flange. One of the lenses is accommodated in one of the circular regions and the other lens is accommodated in the other circular region. This results in a complicated structure for the lens frame. Consequently, when the lens frame is injection molded, it is necessary that the die has two sections that are moved apart from a portion of the dies that defines the flange (i.e., the die sections must be moved in opposite directions with respect to the flange). In such a molding process, the die sections tend to be eccentric due to limitations in the precsion of the process. Accordingly, the circular spaces for accommodating the lenses are not properly centered and the distance between the lenses are not stable. This molding process results in low optical precision. Furthermore, the process is expensive.

SUMMARY OF THE INVENTION

It is an object of the present invention to provide a simple and inexpensive lens holder having a lens frame which can be easily and precisely molded by a simple molding die assembly, without resulting in deviation or misalignment of the lens axis.

To achieve the object mentioned above, according to the present invention, a lens holder, having a cylindrical lens frame, is provided which holds at least one pair of lenses. The lens frame is provided with a lens abutting surface which comes into contact with a first lens to restrict an axial position thereof. The first lens is provided with a positioning reference surface against which the second lens abuts to determine the axial position thereof.

Preferably, the first lens has a diameter larger than that of the second lens.

In a preferred embodiment, the lens frame comprises a first cylindrical portion, a second cylindrical portion having a smaller diameter than the first cylindrical portion, and an intermediate portion on which the lens abutting surface is provided.

Provision is further made for a securing member which is fitted on the lens frame to press the second lens against the first lens.

In an example, the first lens is made of glass and the second lens is made of synthetic resin.

Preferably, the first lens is secured to the lens frame by thermally caulking one end of the lens frame.

According to another aspect of the present invention, a lens holder having a cylindrical lens frame which holds at least one pair of lenses having different diameters is provided, including a large diameter portion, a small diameter portion, and an intermediate stepped portion which connects the large diameter portion and the small diameter portion and which has no inner radial projection. The intermediate stepped portion is tapered from the large diameter portion to the small diameter portion. The large diameter portion, small diameter portion, and intermediate stepped portions are provided on the lens frame. A lens abutting surface is provided on the intermediate stepped portion. An abutting surface is provided on one of the lenses having a larger diameter, so to be fitted in the larger diameter portion of the lens frame. A positioning reference surface is provided on the larger diameter lens to abut against the other lens, so to be fitted in the small diameter portion of the lens frame. An abutting surface, provided on the other lens, is provided to abut against the positioning reference surface.

According to still another aspect of the present invention, a molding die assembly for molding a lens frame is provided, having a large diameter portion, a small diameter portion, and an intermediate stepped portion, which connects the large diameter portion and the small diameter portion and which has no inner radial projection. The die includes a single core molding die having a first shaft portion corresponding to the large diameter portion, a second shaft portion corresponding to the small diameter portion, and a tapered shaft portion corresponding to the intermediate stepped portion. At least one pair of split molding dies are provided which define a predetermined molding cavity for the lens frame together with the core molding die.

The present disclosure relates to subject matter contained in Japanese utility model application No. HEI 4-85962 (filed on Dec. 15, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
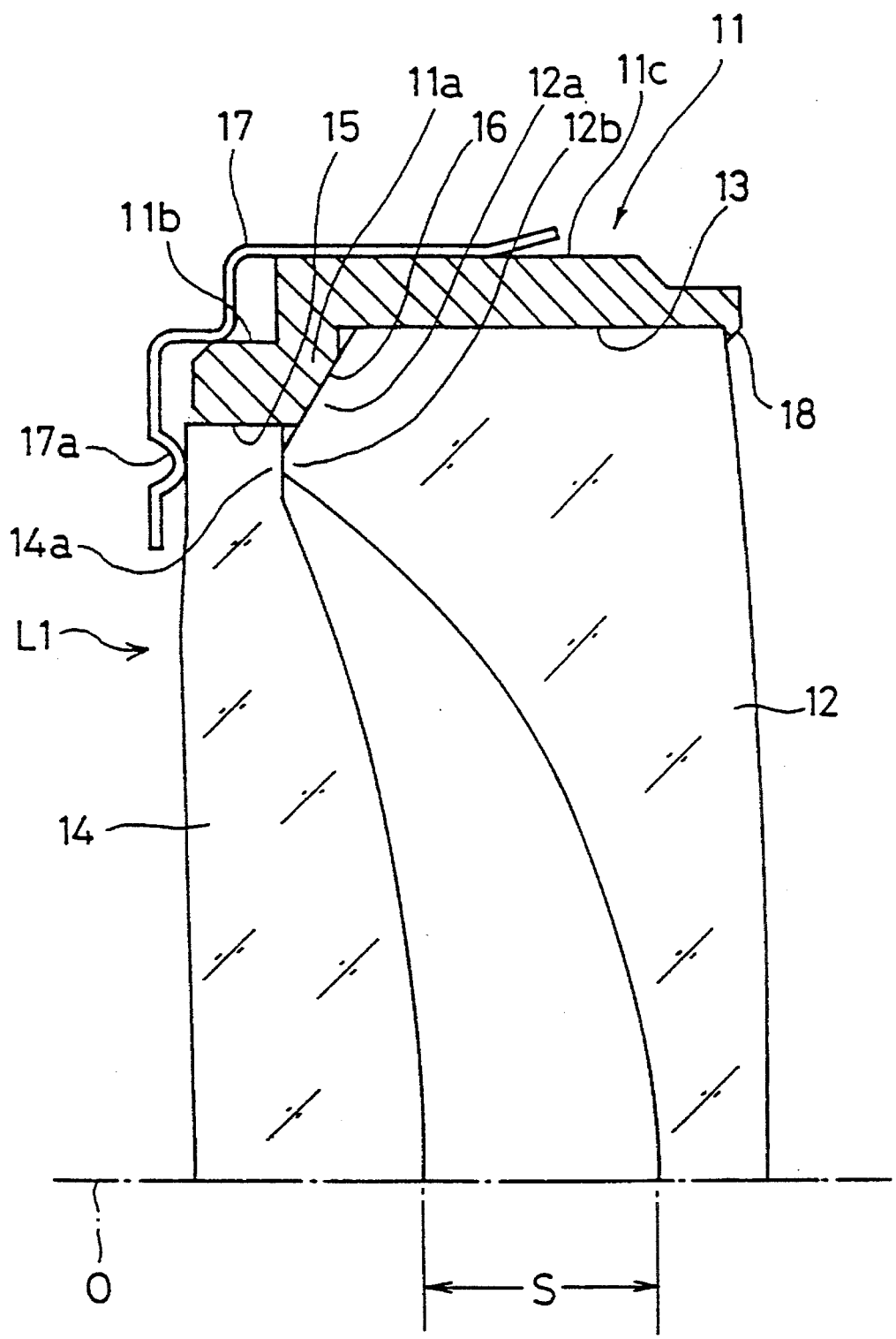
FIG. 1 is a longitudinal sectional view of an upper half of a lens frame of a lens holder according to the present invention; and, FIG. 2 is a front elevational view of a molding die assembly which can be used to mold a lens frame shown in FIG. 1.

A lens frame 11 of a lens holder is generally cylindrical and has a large diameter portion 11c, located on the right side of the lens frame 11, as shown in FIG. 1, and a smaller diameter portion 11b, located on the left side of the lens frame 11. The large diameter portion 11c and the small diameter portion 11b are connected by a stepped portion 11a. The inner peripheral surface of the large diameter port ion 11c is provided with a large diameter lens fitting portion (i.e., first lens fitting portion) 13 in which a first lens 12 can be fitted in a flush manner. Similarly, the inner peripheral surface of the small diameter portion 11b is provided with a small diameter lens fitting portion (i.e., second lens fitting portion) 15 in which a second lens 14 can be fitted in a flush manner. The stepped portion 11a is provided with a lens abutting surface 16 which is tapered from the large diameter lens fitting portion 13 to the small diameter lens fitting portion 15.

According to one of the most significant features of the present invention, there is no flange projecting radially inward from the lens frame between the first lens fitting portion 13 and the second lens fitting portion 15, unlike the prior art. Absence of the radial projection (i.e., flange) makes it possible to make a plastic mold of the lens frame 11 having first and second lens fitting portions 13 and 15, and the tapered lens abutting surface 16, using a single simple molding die (i.e., inner molding die).

Figure 2:
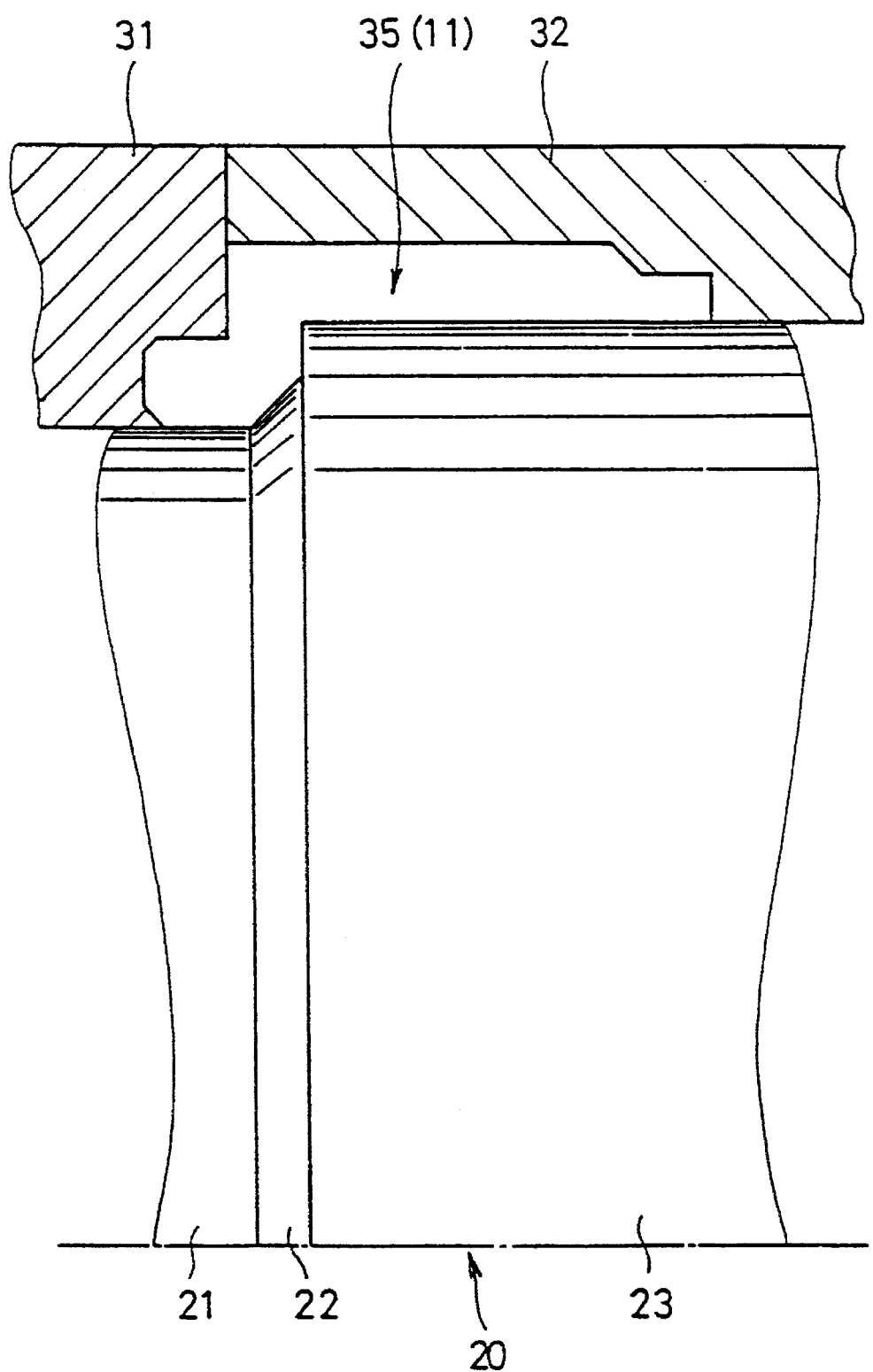

FIG. 2 shows an example of a simple molding die (i.e., inner or core die) 20 in combination with outer split dies 31 and 32.

The inner molding die 20 and the outer molding dies 31 and 32 define a predetermined shape of molding cavity 35 corresponding to the shape of the lens frame 11. The single inner molding die 20 is provided with a first shaft portion 21, an intermediate tapered shaft portion 22, and a second shaft portion 23, corresponding to the first lens fitting portion 13, the lens abutting surface 16 and the second lens fitting portion 15 of the lens frame, respectively. Consequently, the integral formation of the first shaft portion 21, the intermediate tapered shaft portion 22, and the second shaft portion 23 ensures an axial alignment of the first lens fitting portion 13, the lens abutting surface 16 and the second lens fitting portion 15 of the molded lens frame.

In the illustrated embodiment, in which the left and right sides define the front and rear optical sides, respectively, the first lens 12 is a plano-concave lens having a concave lens surface located adjacent to the second lens 14. The first lens 12 is provided with a tapered abutting surface 12a corresponding to the tapered lens abutting surface 16 of the lens frame 11. The first lens 12 is also provided, on the front end of the abutting surface 12a, with a positioning reference surface 12b which determines the axial position of the second lens 14 in the direction of the optical axis 0. When the second lens 14 comes into contact with the reference surface 12b of the first lens 12, the axial position of the second lens 14 is automatically determined.

In the illustrated embodiment, the second lens 14, whose diameter is smaller than that of the first lens 12, is a plano-convex lens having a convex lens surface located adjacent to the first lens 12. The second lens 14 is provided, on the outer peripheral edge thereof, with an abutting surface 14a, which abuts against the reference surface 12b of the first lens 12.

The attachment of the first and second lenses 12 and 14 to the lens frame 11 is carried out as follows.

First, the first lens 12 is fitted in the first lens fitting portion 13 from the right side, as viewed in FIG. 1, until the abutting surface 12a comes into contact with the lens abutting surface 16 of the lens frame 11. During the insertion, the reference surface 12b constitutes the leading end. When the abutting surface 12a abuts against the lens abutting surface 16 of the lens frame 11, the rear end of the lens frame 11 is thermally caulked to form a small radial projection 18 which prevents the first lens from being detached from the first lens fitting portion 13. Thus, the first lens (i.e., large diameter lens) 12 is firmly secured to the first lens fitting portion 13.

Thereafter, the second lens (i.e., small diameter lens) 14 is inserted and fitted in the second lens fitting portion 15 of the lens frame 11 from the opposite direction until the abutting surface 14a of the second lens comes into contact with the reference surface 12b of the first lens 12. After the second lens 14 is fitted in the second lens fitting portion 15, a securing member 17 is fitted on the large diameter portion 11c and the small diameter portion 11b of the lens frame 11 from the front side of the lens frame 11. The securing member 17, which is elastically deformable, is provided with a pressing projection 17a which presses the second lens 14 against the first lens 12, so that the abutting surface 14a is pressed against the reference surface 12b of the first lens 12. Consequently, the second lens 14 is firmly held in the lens frame 11 at a predetermined axial position.

As can be seen from the above discussion, according to the present invention, the first lens 12 is first fitted in the first lens fitting portion 13 of the lens frame 11 until the insertion of the first lens 12 is restricted by the lens abutting surface 16 of the lens frame 11. The second lens 14 is then fitted in the second lens fitting portion 15 of the lens frame 11 until the second lens 14 comes into contact with the first lens 12. The axial positions of the first and second lenses 12 and 14 can be easily and precisely determined. As a result, a predetermined distance S between the first and second lenses 12 and 14 can be automatically obtained.

Moreover, according to the present invention, since the lens frame 11 has no radially extending inner projection or flange, the lens frame 11 can be easily molded with a single interior molding die. Namely, it is not necessary to use a split type of interior molding die assembly in which two interior molding die sections must be moved apart with respect to a inwardly projecting flange. Consequently, according to the present invention, since a single interior molding die is used, the axial alignment of the circular lens fitting portions 13 and 15 of the molded lens frame 11 can be precisely established. Accordingly, the molded lens frames 11, having the lens abutting surfaces 16 at a predetermined axial position and inclination angle, can be inexpensively mass-produced.

The first and second lenses 12 and 14 are made of either glass or synthetic resin. If the first lens 12 is made of glass and the second lens 14 is made of synthetic resin, no deformation of the second lens 14 would occur, since the second lens 14 is pressed at an appropriate pressure against the reference surface 12b of the first lens 12 by the pressing projection 17a of the keeping member 17.

As can be understood from the foregoing, according to the present invention, after the first lens is positioned within the lens frame, the axial position of the second lens can be automatically and easily determined within the lens frame merely by bringing the second lens into contact with the first lens. Consequently, a predetermined distance between the first and second lenses can be precisely obtained. In addition to the foregoing, according to the present invention, the lens frame can be inexpensively molded using a simple single interior molding die, and axial alignment of the lens fitting portions of the lens frame that hold the two lenses can be ensured.

We claim:

1. A lens holder having a cylindrical lens frame which holds at least one pair of lenses; wherein, said lens frame is provided with a lens abutting surface which comes into contact with a first lens upon relative movement between said first lens and said lens frame in a first direction to determine an axial position of said first lens; and wherein, said first lens is provided with a positioning reference surface against which a second lens abuts upon relative movement between said lens frame and said second lens in a second direction opposite to said first direction to determine an axial position of said second lens.

2. The lens holder of claim 1, wherein said first lens has a diameter larger than that of the second lens.

3. The lens holder of claim 2, wherein said lens frame is comprised of a first cylindrical portion, a second cylindrical portion having a smaller diameter than said first cylindrical portion, and an intermediate portion on which said lens abutting surface is provided.

4. The lens holder of claim 1, further comprising a securing member which is fitted on said lens frame to press said second lens against said first lens.

5. The lens holder of claim 1, wherein said first lens is made of glass, and said second lens is made of synthetic resin.

6. The lens holder of claim 5, wherein said first lens is secured to said lens frame by thermally caulking one end of said lens frame.

7. The lens holder having a cylindrical lens frame according to claim 1, abutting forces of said first lens with respect to said lens abutting surface and of said second lens with respect to said positioning reference surface extending in opposite directions with respect to each other.

8. A lens holder having a cylindrical lens frame which holds at least one pair of lenses having different diameters, comprising:

a first diameter portion having a first diameter;

a second diameter portion having a second diameter smaller than said first diameter;

an intermediate stepped portion which connects said first diameter portion and said second diameter portion, said intermediate stepped portion being tapered from said first diameter portion to said second diameter portion, wherein said first diameter portion, said second diameter portion, and said intermediate stepped portion are provided on said lens frame;

a lens abutting surface provided on said intermediate stepped portion;

an abutting surface provided on one of said pair of lenses having a diameter larger than a diameter of another of said pair of lenses, said one of said pair of lenses to be fitted in said first diameter portion of said lens frame in a first direction, and a positioning reference surface provided on said lens having said larger diameter to abut against said another lens to be fitted in said second diameter portion of said lens frame in a second direction opposite to said first direction; and, an abutting surface provided on said other lens to abut against said positioning reference surface.

9. The lens holder of claim 8, further comprising a securing member which is fitted on said lens frame to secure said lens having said small diameter to said lens frame.

10. The lens holder of claim 8, wherein said lens having said larger diameter is secured to said lens frame by thermally caulking an end of said lens frame near said lens having said larger diameter.

11. The lens holder according to claim 8, an abutting force of said abutting surface provided by said one of said lenses having a large diameter on said lens abutting surface provided on said intermediate step portion, and an abutting force provided by said another lens on said abutting surface provided on one of said lenses having said larger diameter acting in directions opposite to each other.

12. A molding die assembly for molding a lens frame having a first diameter portion having a first diameter, a second diameter portion having a second diameter smaller than said first diameter, and an intermediate stepped portion which connects the first diameter portion and the second diameter portion, said intermediate stepped portion being tapered from said first diameter portion to said second diameter portion, and including an abutting surface against which a lens having a diameter corresponding to said first diameter portion is made to abut in a direction opposite to a direction in which a lens having a diameter corresponding to said second diameter portion is made to be inserted into said lens frame, said die assembly comprising:

a single core molding die having a first shaft portion corresponding to said first diameter portion, a second shaft portion corresponding to said second diameter portion, and a tapered shaft portion corresponding to said intermediate stepped portion; and, at least one pair of split molding dies which define a predetermined molding cavity for said lens frame together with said core molding die.

* * * * *